United States Patent
Suzuki et al.

(10) Patent No.: US 9,880,567 B2
(45) Date of Patent: Jan. 30, 2018

(54) VALVE CONTROL APPARATUS AND VALVE CONTROL METHOD

(71) Applicant: TOYOTA JIDOSHA KABUSHIKI KAISHA, Toyota-shi, Aichi-ken (JP)

(72) Inventors: Hiroyuki Suzuki, Ama (JP); Tomio Yamanaka, Nagoya (JP); Yoshiaki Naganuma, Toyota (JP); Mitsuhiro Nada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 9 days.

(21) Appl. No.: 14/938,427

(22) Filed: Nov. 11, 2015

(65) Prior Publication Data

US 2016/0139614 A1 May 19, 2016

(30) Foreign Application Priority Data

Nov. 13, 2014 (JP) ................. 2014-230656

(51) Int. Cl.
 G05D 16/00 (2006.01)
 G05D 16/20 (2006.01)
 F16K 31/00 (2006.01)

(52) U.S. Cl.
 CPC ......... G05D 16/2013 (2013.01); F16K 31/00 (2013.01)

(58) Field of Classification Search
 None
 See application file for complete search history.

(56) References Cited

U.S. PATENT DOCUMENTS

| RE33,649 E | * | 7/1991 | Kawai | G01F 1/26 137/486 |
| 2006/0159970 A1 | * | 7/2006 | Kato | C01B 3/384 429/412 |
| 2012/0183873 A1 | * | 7/2012 | Matsusue | H01M 8/04365 429/431 |
| 2012/0221224 A1 | | 8/2012 | Worthing et al. | |
| 2012/0321979 A1 | * | 12/2012 | Lerner | H01M 8/04992 429/441 |
| 2013/0167810 A1 | * | 7/2013 | Roplekar | F02D 41/045 123/564 |

FOREIGN PATENT DOCUMENTS

| CN | 102678340 A | 9/2012 |
| JP | 2000-163134 | 6/2000 |
| JP | 2009-209758 | 9/2009 |

OTHER PUBLICATIONS

Jay T. Pukrushpan, "Modeling and Control for PEM Fuel Cell Stack System," 2002 American Control Conference TP09-2, 6 pages, 2002.*

* cited by examiner

Primary Examiner — Christopher E Everett
(74) Attorney, Agent, or Firm — Finnegan, Henderson, Farabow, Garrett & Dunner, LLP

(57) ABSTRACT

A valve control apparatus controls a valve for adjusting a pressure of a reaction gas supplied to a fuel cell. The valve control apparatus includes: an estimation portion that estimates a valve effective cross-sectional area of the valve; and an opening adjustment portion that adjusts opening degree of the valve with control amount corrected based on the valve effective cross-sectional area estimated by the estimation portion.

8 Claims, 4 Drawing Sheets

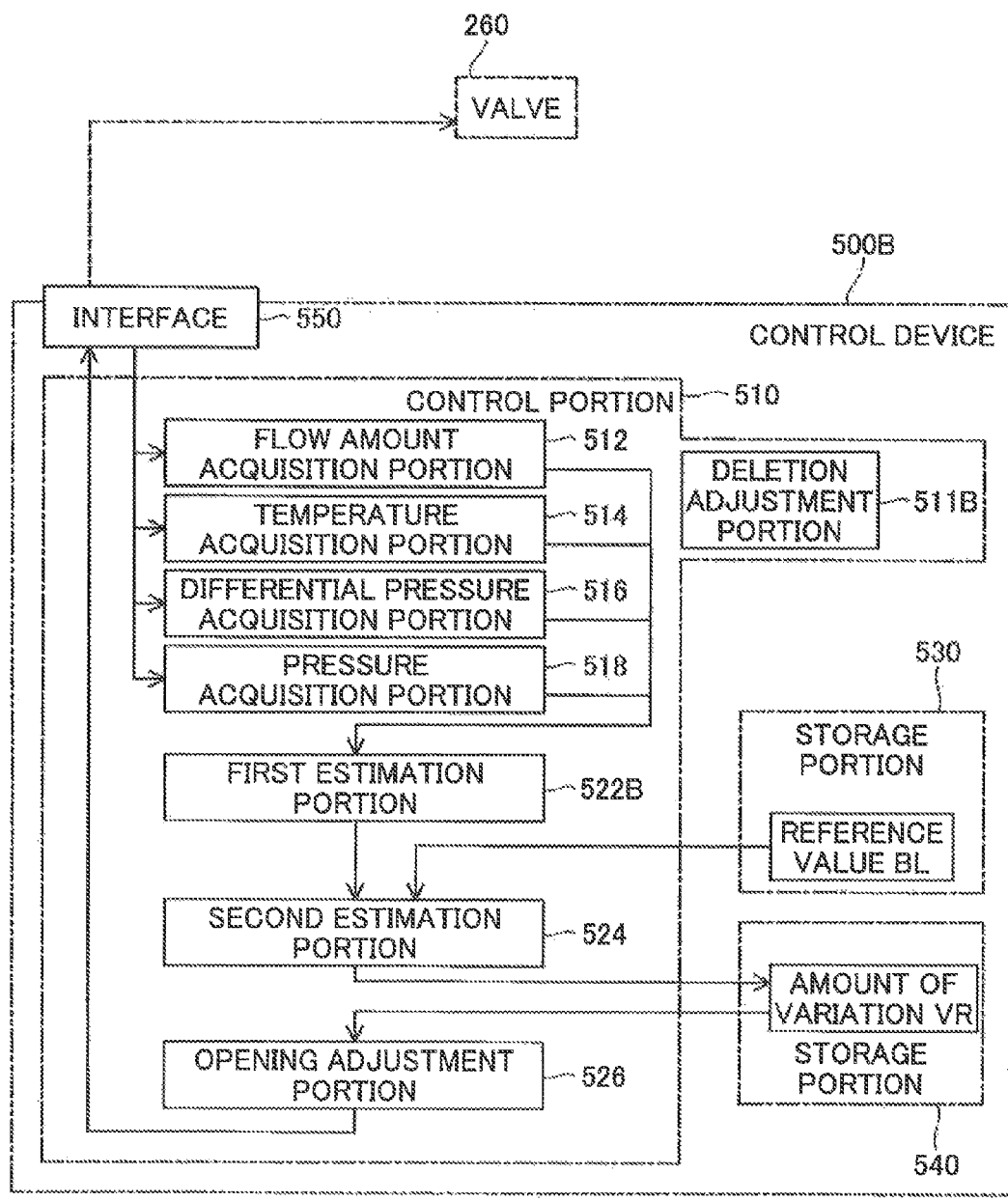

VALVE CONTROL APPARATUS AND VALVE CONTROL METHOD

CROSS-REFERENCE TO RELATED APPLICATION

This application claims priority based on Japanese Patent Application No. 2014-230656 filed on Nov. 13, 2014 the entire disclosure of which is hereby incorporated by reference.

BACKGROUND

Field

The present invention relates to a valve control apparatus and a valve control method.

Related Art

A gas supply system that supplies a reaction gas to a fuel cell includes a valve which adjusts the pressure of the reaction gas supplied to the fuel cell and a valve control device which controls the valve. JP2000-163134A discloses that a valve effective cross-sectional area previously recorded as map data is used to control the amount of reaction gas that flows.

SUMMARY

Since in the gas supply system of patent document 1, consideration is not given to the amount of variation in the opening of the valve caused by the solid difference of the valve, the pressure of the reaction gas in the fuel cell may disadvantageously become excessive or deficient. Hence, a technology capable of controlling the valve according to the amount of variation in the opening of the valve caused by the solid difference of the valve is desired.

The present invention is made to solve at least part of the foregoing problem, and can realize the resolution as aspects below.

(1) According to one aspect of the present invention provides a valve control apparatus controlling a valve for adjusting a pressure of a reaction gas supplied to a fuel cell. The valve control apparatus comprises: an estimation portion that estimates a valve effective cross-sectional area of the valve; and an opening adjustment portion that adjusts opening degree of the valve with control amount corrected based on the valve effective cross-sectional area estimated by the estimation portion. In this aspect, it is possible to control the valve according to the amount of variation in the opening of the valve caused by the solid difference of the valve.

(2) In the valve control device of the above aspect, the estimation portion may estimate the valve effective cross-sectional area when the fuel cell is operated under conditions in which flow amount of the reaction gas flowing through the valve is relatively low and a differential pressure between a primary-side flow path and a secondary-side flow path connected with the valve is relatively high. In this aspect, it is possible to enhance the accuracy with which the valve effective cross-sectional area is estimated by estimating the valve effective cross-sectional area under conditions of such a low flow amount and a high differential pressure that the effect of the individual difference of the valve effective cross-sectional area is relatively increased.

(3) The valve control device of the above aspect may further comprise: a storage portion for storing information based on the valve effective cross-sectional area estimated by the estimation portion; and a deletion adjustment portion that adjusts a differential pressure between a primary-side flow path and a secondary-side flow path connected to the valve to a value higher than in a normal operation when the information is deleted from the storage portion. And the estimation portion may estimate the valve effective cross-sectional area in a state where the differential pressure is adjusted by the deletion adjustment portion. In this aspect, the valve effective cross-sectional area is estimated under conditions of such a high differential pressure that the effect of the individual difference of the valve effective cross-sectional area is relatively increased, and thus it is possible to enhance the accuracy with which the valve effective cross-sectional area is estimated while reducing the deviation of the normal operation.

(4) The valve control device of the above aspect may further comprises: a flow amount acquisition portion that acquires information indicating flow amount of the reaction gas flowing through the valve; a temperature acquisition portion that acquires information indicating temperature of the reaction gas; a differential pressure acquisition portion that acquires information indicating a differential pressure between a primary-side flow path and a secondary-side flow path connected to the valve; and a pressure acquisition portion that acquires information indicating a pressure of the secondary-side flow path. And the estimation portion may estimate the valve effective cross-sectional area based on the flow amount, the temperature, the differential pressure and the pressure. In this aspect, it is possible to estimate the valve effective cross-sectional area based on the formula of orifice.

The present invention can also be realized in various aspects other than the valve control device. For example, the invention of the present application can be realized in aspects such as a fuel cell system, a gas supply device and a valve control method.

BRIEF DESCRIPTION OF DRAWINGS

The invention will be described with reference to the accompanying drawings in which:

FIG. 5 is an illustrative diagram showing the detailed configuration of a valve control device according to a second embodiment.

DESCRIPTION OF EMBODIMENTS

A. First Embodiment

Figure 1:
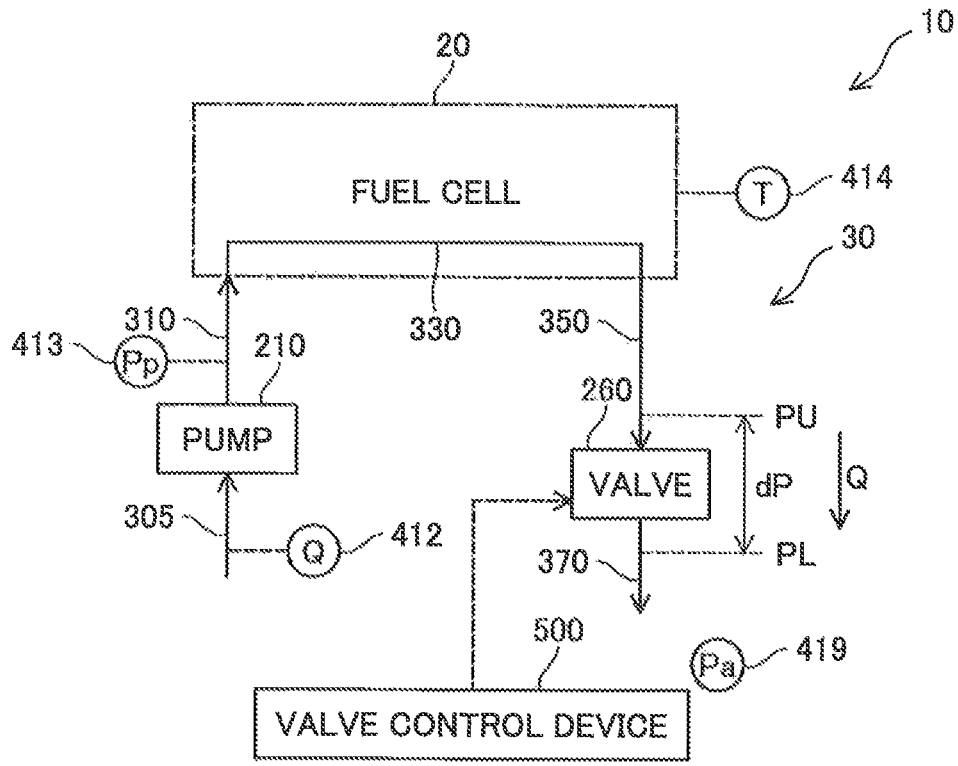
FIG. 1 is an illustrative diagram showing a schematic configuration of a fuel cell system.

FIG. 1 is an illustrative diagram showing a schematic configuration of a fuel cell system 10. The fuel cell system 10 includes a fuel cell 20, and operates the fuel cell 20 to supply electric power. In the present embodiment, the fuel cell system 10 is mounted on a vehicle, and supplies power used for travel of the vehicle.

The fuel cell 20 generates power based on the electrochemical reaction of a reaction gas. In the present embodiment, the fuel cell 20 is a solid polymer-type fuel cell. In the present embodiment, the fuel cell 20 generates power based on the electrochemical reaction of hydrogen and oxygen. In the present embodiment, hydrogen gas and air are supplied to the fuel cell 20 as the reaction gas.

The fuel cell 20 has a stack structure in which a plurality of cells are stacked in layers, and needs to retain a given amount of moisture within the stack so as to maintain the power generation performance. In the present embodiment, since the fuel cell system 10 is a non-humidification system in which the air supplied to the fuel cell 20 is not humidified, even when the temperature of the stack is increased and a power generation load is relatively low, it is necessary to increase the pressure of the air supplied to the fuel cell 20. Hence, even when the amount of air that flows is relatively low, it is required to stably adjust the pressure of the air supplied to the fuel cell 20.

The fuel cell system 10 includes a gas supply device 30 that supplies the air to the fuel cell 20 as an oxidizing gas. In the present embodiment, the gas supply device 30 supplies the air in the atmosphere to the fuel cell 20. The gas supply device 30 includes a pump 210, a valve 260 and a valve control device 500.

The pump 210 of the gas supply device 30 pressurizes and feeds, to the fuel cell 20, the air taken from the atmosphere through an intake flow path 305. The air pressurized and fed by the pump 210 is supplied through a supply flow path 310 to an internal flow path 330 of the fuel cell 20. The air that has passed through the internal flow path 330 is discharged through a discharge flow path 350 from the fuel cell 20.

The valve 260 of the gas supply device 30 is provided between the discharge flow path 350 and an exhaust flow path 370, and adjusts the pressure of the air supplied to the fuel cell 20. The discharge flow path 350 connected to the valve 260 is a primary-side flow path that is located on the upstream side of the flow of the air with respect to the valve 260. The exhaust flow path 370 connected to the valve 260 is a secondary-side flow path that is located on the downstream side of the flow of the air with respect to the valve 260.

In the present embodiment, the valve 260 is an electrically-operated valve formed such that it can adjust the opening based on an electrical signal. In the present embodiment, the valve 260 has sensorless specifications in which various sensors including a sensor sensing the opening are not incorporated. An amount Q of air passing through the valve 260 correlates with an amount of work of the pump 210.

In the present embodiment, in the fuel cell system 10, as various sensors, a flow amount sensor 412, a pressure sensor 413, a temperature sensor 414 and an atmospheric pressure sensor 419 are provided.

The flow amount sensor 412 of the fuel cell system 10 senses the amount of air passing through the intake flow path 305. The flow amount sensed by the flow amount sensor 412 correlates with the amount Q of air passing through the valve 260.

The pressure sensor 413 of the fuel cell system 10 senses a pressure Pp of air passing through the supply flow path 310. A pressure PU of air in the discharge flow path 350 correlates with the pressure Pp sensed by the pressure sensor 413. The pressure PU is a pressure obtained by subtracting the estimated value of a pressure loss in the internal flow path 330 from the pressure Pp.

The atmospheric pressure sensor 419 of the fuel cell system 10 senses an atmospheric pressure Pa. A pressure PL of air in the exhaust flow path 370 correlates with the pressure Pa sensed by the atmospheric pressure sensor 419. The pressure PL is a pressure obtained by adding the estimated value of a pressure loss in the exhaust flow path 370 to the pressure Pa.

The temperature sensor 414 of the fuel cell system 10 senses the internal temperature of the fuel cell 20. The internal temperature sensed by the temperature sensor 414 correlates with a temperature T of air passing through the valve 260.

A valve effective cross-sectional area S of the valve 260 is expressed by the following formula (1) based on the formula of orifice:

[Formula 1]

$$S = \frac{Q}{A} \times \sqrt{\frac{T}{273 \times PL \times dP}} \qquad (1)$$

Q: the amount of air passing through the valve 260
A: a flow amount coefficient
T: the temperature of air passing through the valve 260
PL: the pressure of air after passing through the valve 260 and
dP: the differential pressure (=PU−PL) of air before and after passing through the valve 260

Figure 2:
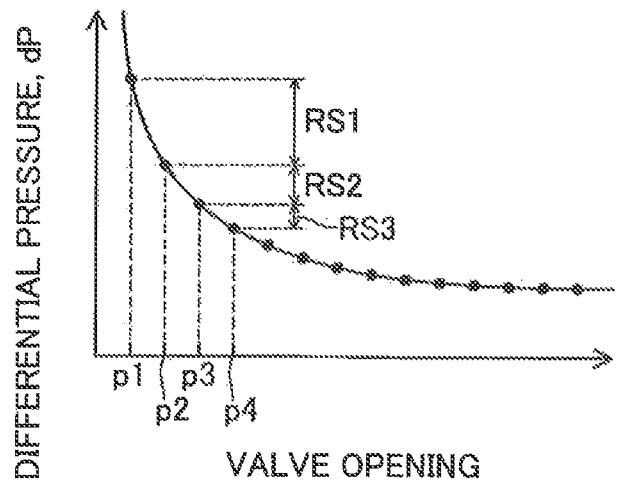
FIG. 2 is a graph showing a relationship between the opening of a valve and a differential pressure.

FIG. 2 is a graph showing a relationship between the opening of the valve 260 and the differential pressure dP. The horizontal axis of FIG. 2 represents the opening of the valve 260. The vertical axis of FIG. 2 represents the differential pressure dP. In a region where the opening of the valve 260 is relatively low, the amount of variation in the differential pressure dP is relatively large whereas in a region where the opening of the valve 260 is relatively high, the amount of variation in the differential pressure dP is relatively small. For example, an amount RS2 of variation in the differential pressure dP when the opening is increased from an opening P2 to an opening p3 is less than an amount RS1 of variation in the differential pressure dP when the opening is increased from an opening P1 to the opening p2 and is more than an amount RS3 of variation in the differential pressure dP when the opening is increased from the opening P3 to an opening P4.

Figure 3:
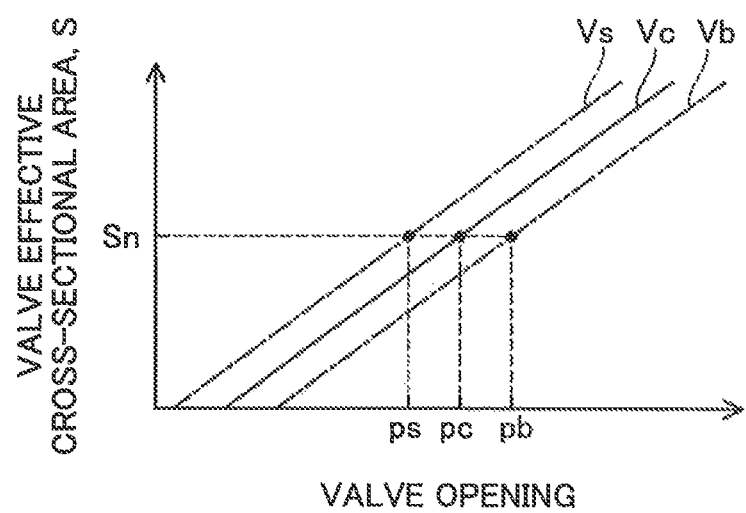
FIG. 3 is a graph showing a relationship between the opening of the valve and a valve effective cross-sectional area.

FIG. 3 is a graph showing a relationship between the opening of the valve 260 and the valve effective cross-sectional area S. The horizontal axis of FIG. 3 represents the opening of the valve 260. The vertical axis of FIG. 3 represents the valve effective cross-sectional area S. A center value Vc represents the valve effective cross-sectional area S corresponding to the opening of the valve 260 of a center value product. A lower limit value Vs represents the valve effective cross-sectional area S corresponding to the opening of the valve 260 of a lower limit value product. An upper limit value Vb represents the valve effective cross-sectional area S corresponding to the opening of the valve 260 of an upper limit value product. Even when the valve effective cross-sectional area S is the same, by the solid difference of the valve 260, variations in the opening of the valve 260 are produced. For example, an opening that realizes a valve effective cross-sectional area Sn is an opening pc in the center value product, is a lower opening pa in the lower limit value product and is a higher opening pb in the upper limit value product.

Figure 4:
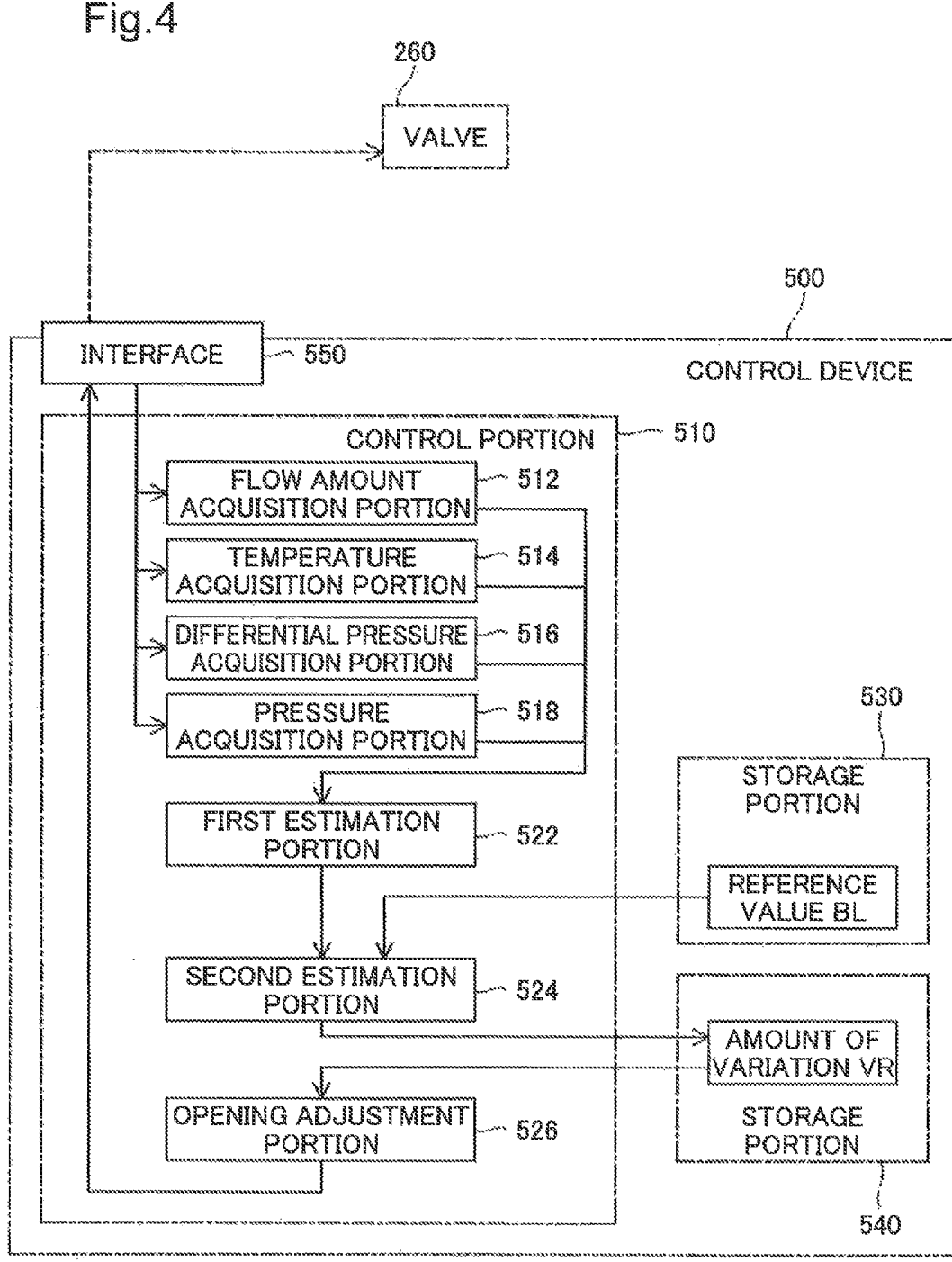
FIG. 4 is an illustrative diagram showing the detailed configuration of a valve control device.

FIG. 4 is an illustrative diagram showing the detailed configuration of the valve control device 500. The valve control device 500 of the fuel cell 20 controls the valve 260. In the present embodiment, the valve control device 500 outputs an electrical signal for driving the valve 260 to adjust the opening of the valve 260. The valve control device 500 includes a control portion 510, a storage portion 530, a storage portion 540 and an interface 550.

The storage portion 530 of the valve control device 500 stores various types of information dealt with by the control portion 510. In the present embodiment, the information stored in the storage portion 530 is information that is previously recorded at the time of manufacturing. In the present embodiment, the storage portion 530 is a ROM (Read Only Memory). In the storage portion 530, a reference value BL is previously stored that is information indicating the valve effective cross-sectional area S corresponding to the opening of the valve 260 in the center value product. In the present embodiment, the reference value BL is the center value Vc indicated in FIG. 3.

The storage portion 540 of the valve control device 500 stores various types of information dealt with by the control portion 510. In the present embodiment, the information stored in the storage portion 540 is deleted when the supply of electric power to the storage portion 540 is stopped. In the present embodiment, the storage portion 540 is a RAM (Static Random Access Memory). In the storage portion 540, as information generated by the control portion 510, an amount VR of variation indicating variations in the opening caused by the solid difference of the valve 260 is stored.

The interface 550 of the valve control device 500 is electrically connected to various types of device in the fuel cell system 10, and information is exchanged between these devices and the control portion 510. In the present embodiment, the interface 550 is connected not only to the valve 260 but also to the pump 210, the flow amount sensor 412, the pressure sensor 413, the temperature sensor 414 and the atmospheric pressure sensor 419.

The control portion 510 of the valve control device 500 performs various types of processing for controlling the valve 260. In the present embodiment, the individual configurations of the control portion 510 are realized through software by the operation of a CPU (Central Processing Unit) of the control portion 510 based on computer programs. In other embodiments, at least part of the configurations of the control portion 510 may be realized through hardware based on the circuit configuration of the control portion 510.

The control portion 510 includes a first estimation portion 522, a second estimation portion 524 and an opening adjustment portion 526. In the present embodiment, the control portion 510 further includes a flow amount acquisition portion 512, a temperature acquisition portion 514, a differential pressure acquisition portion 516 and a pressure acquisition portion 518.

The flow amount acquisition portion 512 of the control portion 510 acquires information indicating the amount Q of air passing through the valve 260. In the present embodiment, the flow amount acquisition portion 512 acquires, through the interface 550, information indicating the flow amount sensed by the flow amount sensor 412, determines, based on this flow amount, the flow amount Q and thereby acquires the information indicating the flow amount Q. In the present embodiment, the flow amount acquisition portion 512 uses the consumed amount of oxygen corresponding to the current value of the fuel cell 20 and the amount of water vapor corresponding to the temperature of the fuel cell 20 to correct the flow amount sensed by the flow amount sensor 412, and thereby determines the flow amount Q. In other embodiments, the flow amount acquisition portion 512 may acquire, through the interface 550, information indicating the amount of work of the pump 210, determine the flow amount Q based on the amount of work of the pump 210 and thereby acquire information indicating the flow amount Q. In other embodiments, the flow amount acquisition portion 512 may acquire information indicating the flow amount Q from a flow amount sensor provided in the valve 260.

The temperature acquisition portion 514 of the control portion 510 acquires information indicating the temperature T of air passing through the valve 260. In the present embodiment, the temperature acquisition portion 514 acquires, through the interface 550, information indicating the temperature of the fuel cell 20 from the temperature sensor 414, determines, based on this temperature, the temperature T and thereby acquires the information indicating the temperature T. In other embodiments, the temperature acquisition portion 514 may acquire information indicating the temperature T from a temperature sensor provided in the valve 260.

The differential pressure acquisition portion 516 of the control portion 510 acquires information indicating the differential pressure dP of air before and after passing through the valve 260. In the present embodiment, the differential pressure acquisition portion 516 acquires, through the interface 550, from the pressure sensor 413, information indicating the pressure Pp, acquires, through the interface 550, from the atmospheric pressure sensor 419, information indicating the atmospheric pressure Pa, determines the differential pressure dP based on the pressure Pp and the atmospheric pressure Pa and thereby acquires information indicating the differential pressure dP. In other words, the differential pressure acquisition portion 516 estimates the differential pressure dP based on the pressure Pp and the atmospheric pressure Pa. In other embodiments, the differential pressure acquisition portion 516 may acquire information indicating the differential pressure dP from differential sensors provided either in the valve 260 or in front of and behind the valve 260.

The pressure acquisition portion 518 of the control portion 510 acquires information indicating the pressure PL of the air that has passed through the valve 260. In the present embodiment, the pressure acquisition portion 518 acquires, through the interface 550, information indicating the atmospheric pressure Pa from the atmospheric pressure sensor 419, determines the pressure PL based on the atmospheric pressure Pa and thereby acquires information indicating the pressure PL. In other words, the pressure acquisition portion 518 estimates the pressure PL based on the atmospheric pressure Pa. In other embodiments, the pressure acquisition portion 518 may acquire information indicating the pressure PL from a pressure sensor provided in the exhaust flow path 370.

The first estimation portion 522 of the control portion 510 estimates the valve effective cross-sectional area S of the valve 260. In the present embodiment, when the fuel cell is operated under conditions in which the flow amount Q is relatively low and the differential pressure dP is relatively high, the first estimation portion 522 estimates the valve effective cross-sectional area S. In the present embodiment, the first estimation portion 522 estimates the valve effective cross-sectional area S based on the flow amount Q measured by the flow amount acquisition portion 512, the temperature T measured by the temperature acquisition portion 514, the differential pressure dP measured by the differential pressure acquisition portion 516 and the pressure PL measured by the pressure acquisition portion 518.

The second estimation portion 524 of the control portion 510 estimates, based on the valve effective cross-sectional area S estimated by the first estimation portion 522, the amount VR of variation in the opening caused by the solid difference of the valve 260. In the present embodiment, the second estimation portion 524 references the reference value BL from the storage portion 530, and estimates, as the amount VR of variation, the number of steps of the opening in which the opening of the valve 260 provided in the gas supply device 30 is displaced with respect to the opening of the center value product. In the present embodiment, the second estimation portion 524 determines the opening of the valve 260 with reference to the state where the valve 260 is fully closed. In the present embodiment, the second estimation portion 524 estimates the amount VR of variation, and thereafter stores the information thereon in the storage portion 540.

The opening adjustment portion 526 of the control portion 510 adjusts the opening of the valve 260 with the amount of control corrected according to the amount VR of variation estimated by the second estimation portion 524. In the present embodiment, the opening adjustment portion 526 uses the amount VR of variation stored in the storage portion 540 to correct the amount of control on the valve 260.

In the first embodiment described above, since the opening of the valve 260 is adjusted with the amount VR of variation estimated based on the valve effective cross-sectional area S, it is possible to control the valve 260 according to the amount of variation in the opening caused by the solid difference of the valve 260.

When the fuel cell 20 is operated under conditions in which the flow amount Q is relatively low and the differential pressure dP is relatively high, the valve effective cross-sectional area S is estimated. As described above, the valve effective cross-sectional area S is estimated under conditions of such a low flow amount and a high differential pressure that the effect of the individual difference of the valve effective cross-sectional area S is relatively increased, and thus it is possible to enhance the accuracy with which the valve effective cross-sectional area S is estimated.

The valve effective cross-sectional area S is estimated based on the flow amount Q, the temperature T, the differential pressure dP and the pressure PL, and thus it is possible to estimate the valve effective cross-sectional area S based on the formula of orifice.

B. Second Embodiment

FIG. 5 is an illustrative diagram showing the detailed configuration of a valve control device 500B according to a second embodiment. The fuel cell system 10 of the second embodiment is the same as in the first embodiment except that instead of the valve control device 500 of the first embodiment, the valve control device 500B is included. The valve control device 500B of the second embodiment is the same as the valve control device 500 of the first embodiment except that the control portion 510 includes a deletion adjustment portion 511B and that instead of the first estimation portion 522 of the first embodiment, a first estimation portion 522B is included.

When the amount VR of variation is deleted from the storage portion 540, the deletion adjustment portion 511B of the valve control device 500B make an adjustment such that the differential pressure dP is higher than in a normal operation. In the present embodiment, the conditions in which the amount VR of variation is deleted from the storage portion 540 are a case where, for example, power supplied to the storage portion 540 is interrupted when a storage cell serving as the power supply of the valve control device 500B is replaced (so-called battery clear). In the present embodiment, the deletion adjustment portion 511B outputs, through the interface 550, a control signal to the valve 260 to make an adjustment such that the differential pressure dP is higher than in the normal operation.

The first estimation portion 522B of the valve control device 500B is the same as the first estimation portion 522 of the first embodiment except that in the state where the differential pressure dP is adjusted by the deletion adjustment portion 511B, the valve effective cross-sectional area S is estimated. In the present embodiment, the first estimation portion 522B waits until the flow amount Q is lowered through the adjustment of the differential pressure dP by the deletion adjustment portion 511B, and thereafter the first estimation portion 522B estimates the valve effective cross-sectional area S. In the fuel cell system 10 of the present embodiment, even when the differential pressure dP is actively increased more than in the normal operation, since it is possible to cope with a requirement output in the fuel cell 20, the drive ability is not affected. However, when the flow amount Q is actively lowered more than in the normal operation, an output from the fuel cell 20 may not satisfy the requirement output, with the result that the drive ability may be lowered.

In the second embodiment described above, since as in the first embodiment, the opening of the valve 260 is adjusted with the amount VR of variation estimated based on the valve effective cross-sectional area S, it is possible to control the valve 260 according to the amount of variation in the opening caused by the solid difference of the valve 260.

When the amount VR of variation is deleted from the storage portion 540, in a state where the differential pressure dP is adjusted to be higher than in the normal operation, the valve effective cross-sectional area S is estimated. As described above, the valve effective cross-sectional area S is estimated under conditions of such a high differential pressure that the effect of the individual difference of the valve effective cross-sectional area S is relatively increased, and thus it is possible to enhance the accuracy with which the valve effective cross-sectional area S is estimated while reducing the deviation of the normal operation.

C. Other Embodiments

The present invention is not limited to the embodiments, examples and variations described above, and can be realized with various configurations without departing from the spirit thereof. For example, the technical features of the embodiments, examples and variations corresponding to the technical features in the aspects described in the section of Summary of the Invention can be replaced or combined as necessary so that part or the whole of the problem describe previously is solved or part or the whole of the effects described previously is achieved. When the technical features are not described as necessary features in the present specification, they can be deleted as necessary. For example, the present invention is not limited to the control of the valve for adjusting the pressure of air supplied to the fuel cell 20, and can be applied to the control of a valve for adjusting the pressure of other gasses.

The valve control device uses the formula of orifice to estimate the amount of variation in the differential pressure dP with respect to the opening of the valve 260, and when the amount of variation in the differential pressure dP with respect to the opening falls within the deviation between a target pressure and a current pressure on the air supplied to the fuel cell 20, the valve control device may adjust the opening of the valve 260. In this way, it is possible to prevent the pressure of the air supplied to the fuel cell 20 from being rapidly increased or decreased by the adjustment of the opening of the valve 260.

The valve control device may determine the timing at which the opening of the valve 260 is adjusted by estimating the responsiveness of the pressure of the air supplied to the fuel cell 20 based on the flow amount Q. In this way, it is possible to prevent the pressure of the air supplied to the fuel cell 20 from being rapidly increased or decreased by the adjustment of the opening of the valve 260.

What is claimed is:

1. A valve control apparatus controlling a valve for adjusting a pressure of a reaction gas supplied to a fuel cell, the valve control apparatus comprising:
   an estimation portion that estimates a valve effective cross-sectional area of the valve; and
   an opening adjustment portion that adjusts opening degree of the valve with control amount corrected based on the valve effective cross-sectional area estimated by the estimation portion, wherein:
   the estimation portion estimates the valve effective cross-sectional area by calculating the valve effective cross-sectional area using the following Formula 1:

[Formula 1]

$$S = \frac{Q}{A} \times \sqrt{\frac{T}{273 \times PL \times dP}}$$

S being the valve effective cross-sectional area,
   Q being an amount of air passing through the valve,
   A being a flow amount coefficient,
   T being a temperature of air passing through the valve,
   PL being a pressure of air after passing through the valve, and
   dP being a differential pressure of air before and after passing through the valve, and
   the opening adjustment portion estimates a difference of a reference value of a number of steps of opening in the valve corresponding to the estimated valve effective cross-sectional area, and a current number of steps of opening in the valve, as an amount of opening variation, and adjusts an opening degree of the valve with a control amount in accordance with the estimated amount of opening variation.

2. The valve control apparatus according to claim 1, wherein the estimation portion estimates the valve effective cross-sectional area when the fuel cell is operated under conditions in which flow amount of the reaction gas flowing through the valve is lower than a threshold flow amount and a differential pressure between a primary-side flow path and a secondary-side flow path connected with the valve is higher than a threshold differential pressure.

3. The valve control apparatus according to claim 1, the valve control apparatus further comprising:
   a storage portion for storing information based on the valve effective cross-sectional area estimated by the estimation portion; and
   a deletion adjustment portion that adjusts a differential pressure between a primary-side flow path and a secondary-side flow path connected to the valve to a value higher than a threshold differential pressure when the information is deleted from the storage portion,
   wherein the estimation portion estimates the valve effective cross-sectional area in a state where the differential pressure is adjusted by the deletion adjustment portion.

4. The valve control apparatus according to claim 1, the valve control apparatus further comprising:
   a flow amount acquisition portion that acquires information indicating flow amount of the reaction gas flowing through the valve;
   a temperature acquisition portion that acquires information indicating temperature of the reaction gas;
   a differential pressure acquisition portion that acquires information indicating a differential pressure between a primary-side flow path and a secondary-side flow path connected to the valve; and
   a pressure acquisition portion that acquires information indicating a pressure of the secondary-side flow path,
   wherein the estimation portion estimates the valve effective cross-sectional area based on the flow amount, the temperature, the differential pressure and the pressure.

5. A valve control method of controlling a valve for adjusting a pressure of a reaction gas supplied to a fuel cell, the valve control method comprising:
   estimating a valve effective cross-sectional area of the valve; and
   adjusting opening degree of the valve with control amount corrected based on the estimated valve effective cross-sectional area, wherein:
   estimating the valve effective cross-sectional area includes calculating the valve effective cross-sectional area using the following Formula 1:

[Formula 1]

$$S = \frac{Q}{A} \times \sqrt{\frac{T}{273 \times PL \times dP}}$$

S being the valve effective cross-sectional area,
   Q being an amount of air passing through the valve,
   A being a flow amount coefficient,
   T being a temperature of air passing through the valve,
   PL being a pressure of air after passing through the valve, and
   dP being a differential pressure of air before and after passing through the valve, and
   adjusting opening degree of the valve includes estimating a difference of a reference value of a number of steps of opening in the valve corresponding to the estimated valve effective cross-sectional area, and a current number of steps of opening in the valve, as an amount of opening variation, and adjusting an opening degree of the valve with a control amount in accordance with the estimated amount of opening variation.

6. The valve control method according to claim 5, the valve control method further comprising estimating the valve effective cross-sectional area when the fuel cell is operated under conditions in which flow amount of the reaction gas flowing through the valve is lower than a threshold flow amount and a differential pressure between a primary-side flow path and a secondary-side flow path connected with the valve is higher than a threshold differential pressure.

7. The valve control method according to claim 5, the valve control method further comprising:

storing information in a storage portion, the information being based on the estimated valve effective cross-sectional area;

adjusting a differential pressure between a primary-side flow path and a secondary-side flow path connected to the valve to a value higher than a threshold differential pressure when the information is deleted from the storage portion; and estimating the valve effective cross-sectional area in a state where the differential pressure is adjusted when the information is deleted from the storage portion.

8. The valve control method according to claim 5, the valve control method further comprising:

acquiring information indicating flow amount of the reaction gas flowing through the valve;

acquiring information indicating temperature of the reaction gas;

acquiring information indicating a differential pressure between a primary-side flow path and a secondary-side flow path connected to the valve;

acquiring information indicating a pressure of the secondary-side flow path; and estimating the valve effective cross-sectional area based on the flow amount, the temperature, the differential pressure and the pressure.

* * * * *